Oct. 21, 1947. W. C. NABORS 2,429,483
LOWER FIFTH WHEEL
Filed Nov. 14, 1945 2 Sheets-Sheet 2

Inventor
William C. Nabors.
By E. V. Hardway,
Attorney

Patented Oct. 21, 1947

2,429,483

UNITED STATES PATENT OFFICE 2,429,483

LOWER FIFTH WHEEL

William C. Nabors, Mansfield, La.

Application November 14, 1945, Serial No. 628,451

7 Claims. (Cl. 280—33.05)

This invention relates to a lower fifth wheel.

An object of the invention is to provide novel means for connecting a trailer to, and disconnecting it from, a tractor.

More specifically the invention embodies novel means in the lower fifth wheel construction for engaging the king pin of the upper fifth wheel carried by the tractor.

Another object of the invention is to provide, in a lower fifth wheel construction, a pair of similar, oppositely disposed jaws which are pivoted at their forward ends and which are formed to engage about the king pin and which will not be liable to become disengaged under the stress of the load, with a slidably mounted jaw yoke plate which is yieldably maintained in position to embrace said jaws to additionally secure the jaws in engagement with the king pin.

It is a further object of the invention to provide means for moving the jaw yoke plate into inactive position and to simultaneously release the jaws from the king pin and latch them in said released position.

It is a further object of the invention to provide, in a lower fifth wheel construction, stops for positively locking the king pin-engaging jaws in said released position so as to prevent their premature closing.

It is a further object of the invention to provide in a lower fifth wheel construction a control trip lever arranged to be engaged by the king pin of the upper fifth wheel and to be actuated thereby to move said stops into released position and to release said latch means to allow the jaw yoke plate and the jaws to simultaneously move into active position to lock the jaws in engagement with the king pin.

Generally speaking the lower fifth wheel construction is such that the jaws may be released to allow the tractor to be detached from the trailer and maintained in said released position until the tractor is again moved into position to be coupled to the trailer and the king pin-engaging device thereupon automatically released to effectuate the coupling of the structure to the trailer.

With the above and other objects in view the invention has particular relation to certain novel features of construction, operation, arrangement of parts and use, an example of which is given in this specification and illustrated in the accompanying drawings, wherein—

Figure 2:
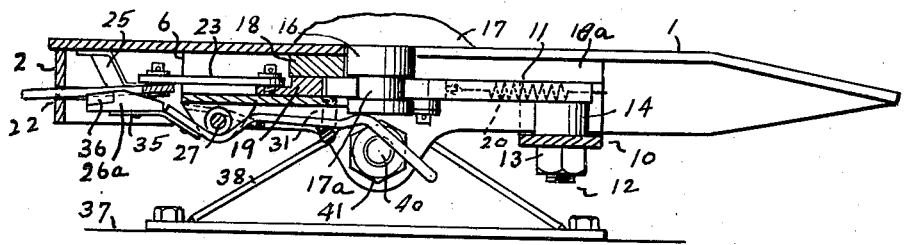
Figure 2 is a sectional view taken on the line 2—2 of Figure 1.

Referring now more particularly to the drawings wherein like numerals of reference designate similar parts in each of the figures, the numeral 1 designates the lower fifth wheel plate which is reinforced by a substantially U-shaped depending flange 2 which may be welded thereto and which depends from the margin thereof all the way around from the front to the rear.

The forward portion of the plate has the forward extensions 3, 3 with the deep king pin-receiving slot 4 which diverges forwardly and the inner margins of the extensions 3 may have the depending marginal flanges 5, 5 welded thereto.

Figure 3:
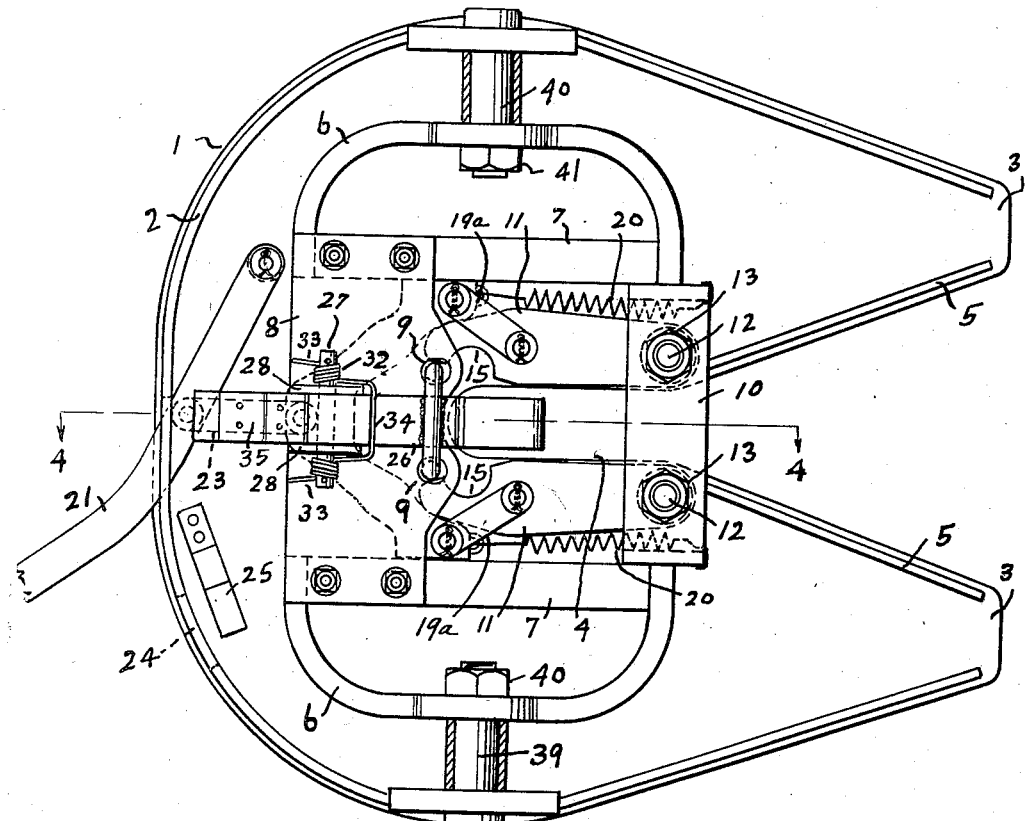
Figure 3 is a bottom plan view thereof showing said jaws in released position.

The forward ends of the flanges 2 and 5 taper forwardly to an apex and the forward ends of the extensions 3 decline forwardly, as more clearly shown in Figures 2 and 3.

Secured to the underside of the plate 1, on opposite sides, are the outwardly curved brackets 6, 6 which are spaced apart and are of similar shape and which are spaced inwardly from the side margins of the lower fifth wheel. Extending from end to end of these brackets 6 and secured to the plate 1 are the parallel bars 7, 7.

Securely fastened to the rear ends of these bars 7, underneath, there is a cover plate 8 whose forward margin is located just to the rear of the rear end of the slot 4. This cover plate has the spaced openings 9, 9 therethrough for a purpose to be hereinafter explained.

Figure 5:
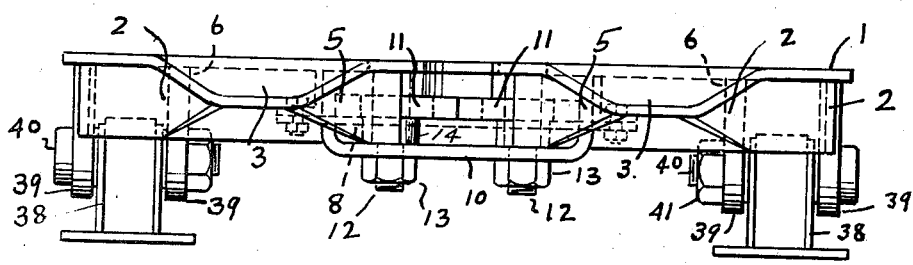
Figure 5 is a front elevation.

Located between the forward ends of the brackets 6 there is a U-shaped plate 10 which is best shown in Figure 5 and whose over turned ends may be secured in any approved manner to the fifth wheel structure.

The numerals 11, 11 designate the king pin-engaging jaws which are arm like in shape and whose forward ends are pivoted on the studs 12, 12. These studs may be secured to the fifth wheel structure in any preferred manner as by welding. They extend outwardly through the plate 10 and their outer ends are threaded to receive the nuts 13. The jaws 11 are maintained spaced from the plate 10 by means of spacers 14 which surround said studs and are located between the jaws 11 and the plate 10, as shown more clearly in Figure 4.

The rear ends of the jaws 11 have opposed arcuate recesses 15, which register when the jaws are in closed position to form a bearing to receive the king pin 16 carried by the upper fifth wheel 17 of the tractor, as more clearly shown in Figure 2 and this king pin has an annular groove 17a therearound in which the jaws 11 fit when the jaws are closed about the king pin to couple the tractor to the trailer.

From the foregoing it will be apparent that the stress exerted by the king pin against the jaws 11 will be substantially longitudinally of the jaws and there will be no strain tending to force the jaws apart to cause uncoupling of the tractor from the trailer.

The central portion of the plate 1 is reinforced by means of a rectangular block 18 which is fitted between the bars 7 and which has a slot 18a extending rearwardly from the forward margin thereof and coinciding with the king pin slot 4 of the plate 1.

Slidably mounted between the block 18 and the cover plate 8 there is a jaw yoke plate 19 which has the forwardly diverging arms arranged to embrace the rear ends of the jaws 11. Connected to the free ends of the arms of the jaw yoke plate are the coil springs 20, 20 and the forward ends of these springs are connected to the over turned ends of the plate 19. These coil, pull springs 20 are provided to normally hold the jaw yoke plate in active position, that is in position to engage the free, rear ends of the jaws 11 and hold said jaws in active, or king pin-engaging, position.

There is a handle 21 which is pivoted, at one end, to the lower fifth wheel structure and whose other end is outwardly curved and works through a slot 22 through the flange 2, and at the rear of the lower fifth wheel. There is a link 23 which is pivotally connected, at one end, to the jaw yoke plate and, at its other end, to the handle 21. The handle when moved into inactive position will be engaged in a notch 24 at one end of the slot 22 and will be thereby held in inactive position. In order to insure the engagement of said handle in said notch a flat pressure spring 25 has been provided which is secured, at one end, to the plate 1 and whose other end is free and downwardly turned so as to force said handle into said notch. This spring 25 is not indispensable but is provided as an additional precaution to prevent the unintentional disengagement of the handle from said notch 24.

A control trip lever 26 has been provided. This trip lever is mounted to pivot on a transverse rod 27 which is mounted to rotate in bearings in the side plates 28, 28 which embrace said lever and depend from the cover plate 8. The forward end of the control trip lever extends underneath the rear end of the slots 4 and 19 and said forward end is downwardly turned. There is a U-shaped rod 30 which is secured to said control trip lever, preferably by welding, and whose ends are up turned on opposite sides of said lever and extend up through the openings 9 forming the stops 31, 31 which are positioned to engage the free ends of the jaws 11, when said jaws are in open, or released, position to lock them open, as indicated in Figures 3 and 4.

Figure 1:
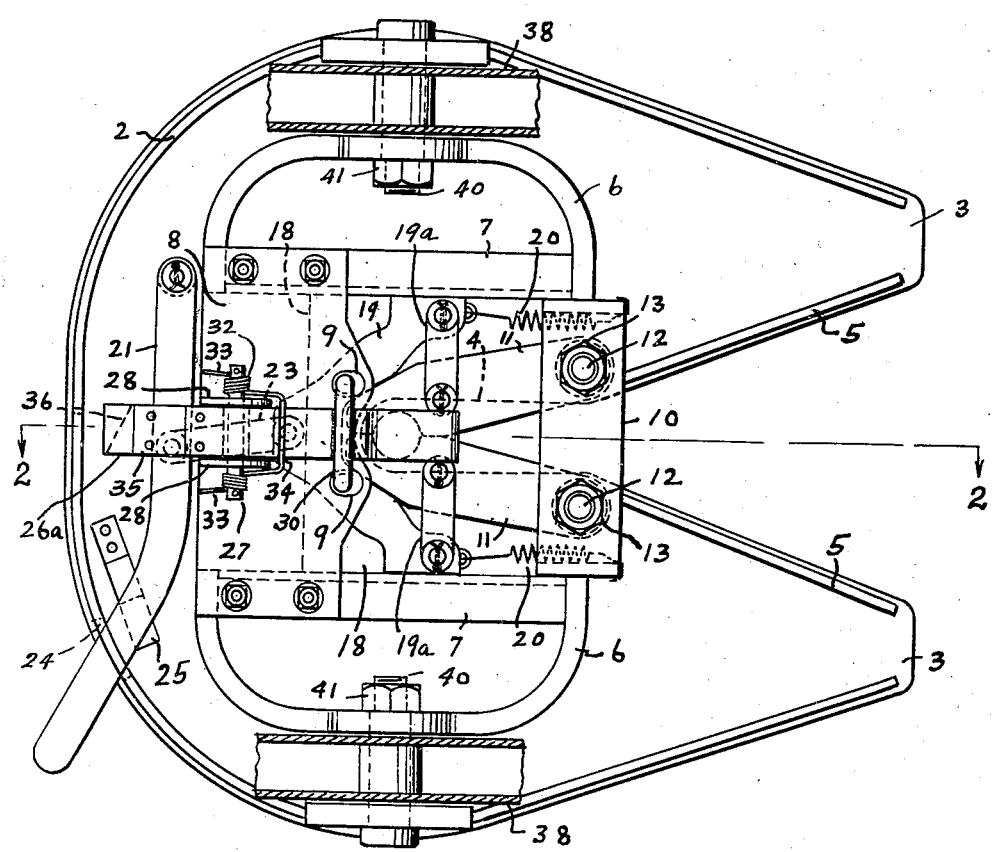
Figure 1 is a bottom plan view of the lower fifth wheel showing the king pin-engaging jaws in active, or closed, position.
Figure 4:
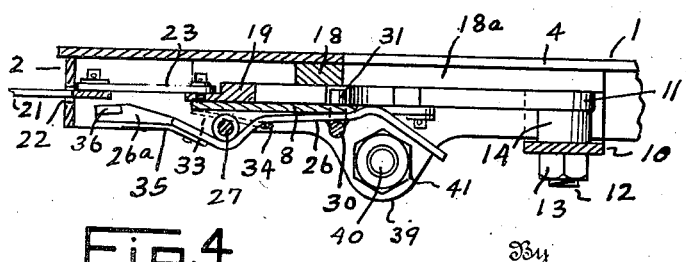
Figure 4 is a fragmentary, sectional view taken on the line 4—4 of Figure 3.

There is a tension spring, indicated generally by the numeral 32 which is coiled around the ends of the rod 27 and whose free rear ends 33 engage against the underside of the cover plate 8, as shown in Figures 1, 3 and 4. These coils are connected by a cross bar 34 which engage underneath the control trip lever in front of the rod 27 and said spring normally holds the forward end of said trip lever in its upper position with the stops 31 projecting above the cover plate, as illustrated in Figure 4.

The rear end of the control trip lever has a rearwardly inclined latch 26a fastened thereto by means of a flat spring 35 and the rear end of this latch is formed with a diagonal shoulder 36 to engage the handle 21 when said handle is moved to releasing position, as indicated in Figure 3.

The free ends of the arms of the jaw yoke plate are connected to the corresponding jaws by the links 19a, 19a whose ends are pivotally connected to said arms and to said jaws, respectively, and, through these links, when the jaw yoke plate is moved to inactive, or retracted, position the said jaws will be correspondingly moved to inactive, or open, position, as shown in Figure 3, and when the jaw yoke plate is moved to active position, by the springs 20, said jaws will also be moved to active position around the king pin, as shown in Figure 1.

The numeral 37 designates the forward end of the trailer on which the lower fifth wheel is mounted and fixed to the trailer, on opposite sides, are the mounting brackets 38, 38 having aligned bearings and depending from the lower fifth wheel structure are the lugs 39, 39 which embrace the corresponding mounting brackets and which have bearings which align with the bearings of said brackets. Extended through these aligned bearings are the spindles 40, 40 having the outer end heads and whose inner ends are threaded to receive the retaining nuts 41, 41 whereby the lower fifth wheel structure is mounted to pivot on a horizontal axis.

In operation when it is desired to disconnect the draft vehicle from the trailer the handle 21 may be disengaged from the notch 24 and swung rearwardly riding along the upper side of the latch 26a and engaging behind the shoulder 36. This will operate, through the link 23, to retract the jaw yoke plate 19, placing the springs 20 under tension and swinging the jaws 11 to open position to release the king pin and uncouple the draft vehicle from the trailer. The coupling mechanism will remain in said position until it is desired to again couple the trailer to the draft vehicle whereupon the draft vehicle will be backed, by the driver, so as to cause the king pin 16 to move along the slots 4, 18a and into contact with the downwardly turned end of the control trip lever, moving the forward end of the trip lever downwardly and releasing the stops 31 from the jaws 11 and upon this actuation of the control trip lever the latch 26a will yield downwardly and the handle 21 will be released from the shoulder 36 and the springs 20 will thereupon move the jaw yoke plate 19 forwardly into embracing relation with the jaws 11, the links 19a, 19a operating to simultaneously close said jaws about the king pin.

Should the driver of the draft vehicle not back said vehicle in such a manner as to cause the king pin to move along said slots, as normally expected, and should the king pin climb up on top of the fifth wheel plate 2 and drop through said slots onto said control trip lever the operation will be the same as above explained without injuring the operating mechanism.

The description and drawings are illustrative merely. It is contemplated that certain changes may be made in mechanical construction: For example, the plate 1 and the depending flanges 2 and 5 and the other parts fixed to said plate may, as far as practical, be cast into a unit and the dimensions and design of the operating mechanism may be varied without departing

What I claim is:

1. A lower fifth wheel comprising, a supporting structure having a forwardly directed slot; jaws pivoted at their forward ends to the structure on opposite sides of the slot and whose rear ends are shaped to form a king pin bearing, when the jaws in active position; a jaw yoke plate shaped to embrace said rear ends of the jaws and hold them in said active, or co-operative, position around said king pin; yieldable means normally holding said jaw yoke plate in said embracing, or active, position; means for moving the jaw yoke plate to inactive position to release the jaws; means for holding said moving means and plate in said inactive position, and means interconnecting the jaw yoke plate and jaws whereby they simultaneously move to active or inactive positions.

2. A lower fifth wheel comprising, a plate having a forwardly directed king pin slot; confronting jaws pivoted, at their forward ends, on opposite sides of the slot and whose rear ends have complementary recesses to form a king pin bearing; a jaw yoke plate; yieldable means normally holding said jaw yoke plate in position to embrace the rear ends of the jaws to hold them in active position around a king pin of a tractor upper fifth wheel; means for moving and latching said jaw yoke plate in inactive, or retracted, position; means connecting the jaw yoke plate to the jaws and effective to move the jaws into active, or inactive, positions with the jaw yoke plate, and retractable stops automatically movable to position to lock the jaws inactive.

3. A lower fifth wheel comprising, a plate having a forwardly directed king pin slot; confronting jaws pivoted, at their forward ends, on opposite sides of the slot and whose rear ends have complementary recesses to form a king pin bearing; a jaw yoke plate; yieldable means normally holding said jaw yoke plate in position to embrace the rear ends of the jaws to hold them in active position around a king pin of a tractor upper fifth wheel; means for moving and latching said jaw yoke plate in inactive, or retracted, position; means connecting the jaw yoke plate to the jaws and effective to move the jaws into active, or inactive, positions with the jaw yoke plate; retractable stops automatically movable to position to lock the jaws inactive; a control trip lever arranged to be engaged and moved by the king pin, as it enters the king pin bearing, and adapted to retract said stops and release said latch means to allow the jaw yoke plate and jaws to move to active position.

4. A lower fifth wheel comprising, a supporting structure having a forwardly directed, forwardly flared, slot; jaws pivoted at their forward ends to the structure on opposite sides of the slot and whose rear ends are shaped to form a king pin bearing, when the jaws are in active position; a jaw yoke plate shaped to embrace the rear ends of said jaws and hold them in said active, or co-operative, position around said king pin; yieldable means normally holding said jaw yoke plate in said embracing, or active, position; means for moving the jaw yoke plate to inactive position to release the jaws; means for holding said moving means and plate in said inactive position; means arranged to be actuated by the king pin of a tractor, as said pin moves into its bearing, to release said holding means, and means interconnecting the jaw yoke plate and jaws whereby they simultaneously move to active or inactive positions.

5. A lower fifth wheel comprising, a supporting structure having a forwardly directed slot; jaws pivoted at their forward ends to the structure on opposite sides of the slot to open and close and shaped to form a king pin bearing, rearwardly of their pivoted ends, when closed; means shaped to embrace the rear ends of said jaws to hold them in active or closed position; means for manually moving said jaw-embracing means to inactive, or retracted, position to release the jaws to allow them to open; means for retaining said moving means and jaw embracing means in said inactive position; trip means arranged to be actuated by a tractor king pin and effective to release said retaining means, and means for automatically moving the jaw embracing means to active, or jaw-embracing position upon such release.

6. A lower fifth wheel comprising, a supporting structure having a forwardly directed slot; jaws pivoted at their forward ends to the structure on opposite sides of the slot to open and close and shaped to form a king pin bearing when closed; means shaped to embrace said jaws to hold them in active or closed position; means for manually moving said jaw-embracing means to inactive, or retracted, position to release the jaws to allow them to open; means for retaining said moving means and jaw embracing means in said inactive position; trip means having stops thereon to lock said jaws open, said trip means being arranged to be actuated by a tractor king pin and effective to release said retaining means and stops, and means for automatically moving the jaw embracing means to active, or jaw-embracing position upon such release.

7. A lower fifth wheel comprising, a supporting structure having a forwardly directed slot; jaws pivoted at their forward ends to the structure on opposite sides of the slot to open and close and shaped to form a king pin bearing when closed; means shaped to embrace said jaws to hold them in active or closed position; means for manually moving said jaw-embracing means to inactive, or retracted, position to release the jaws to allow them to open; means for retaining said moving means and jaw embracing means in said inactive position; trip means having stops thereon to lock said jaws open, said trip means being arranged to be actuated by a tractor king pin and effective to release said retaining means and stops; means for automatically moving the jaw embracing means to active, or jaw-embracing, position upon such release, and means interconnecting the jaw yoke plate and jaws whereby they will simultaneously move to active, or inactive, positions.

WILLIAM C. NABORS.

REFERENCES CITED

The following references are of record in the file of this patent:

UNITED STATES PATENTS

| Number | Name | Date |
| --- | --- | --- |
| 1,641,354 | Reid | Sept. 6, 1927 |
| 1,996,425 | Ketel | Apr. 2, 1935 |
| 2,044,227 | Robb | June 16, 1936 |
| 2,102,821 | Seyferth | Dec. 21, 1937 |